United States Patent [19]

Sickler

[11] 4,211,364
[45] Jul. 8, 1980

[54] HEATING SYSTEM FOR A REVOLVING CAB
[75] Inventor: Emory J. Sickler, Wausau, Wis.
[73] Assignee: J. I. Case Company, Racine, Wis.
[21] Appl. No.: 884,256
[22] Filed: Mar. 7, 1978
[51] Int. Cl.³ .............................................. B60H 1/02
[52] U.S. Cl. ................................. 237/12.3 A; 165/41; 180/77 S; 280/433
[58] Field of Search ...................... 237/12.3 A, 12.3 B, 237/12.3 C; 98/2.05; 165/41; 296/1 R, 28 C; 180/77 S; 280/433; 285/122, 272, 273, 274; 239/243; 308/DIG. 2

[56] References Cited
U.S. PATENT DOCUMENTS

| | | | |
|---|---|---|---|
| 2,118,884 | 5/1938 | Fuchs | 237/12.3 B |
| 3,112,002 | 11/1963 | van der Lely | 165/41 |
| 3,134,628 | 5/1964 | Lackey et al. | 280/433 |
| 3,339,946 | 5/1967 | Kreidel et al. | 285/272 |

FOREIGN PATENT DOCUMENTS 766350 3/1933 France .
1125281 10/1956 France ................................... 285/122

Primary Examiner—Albert J. Makay
Assistant Examiner—Henry A. Bennett
Attorney, Agent, or Firm—Arthur J. Hansmann

[57] ABSTRACT

A heating system for a revolving cab rotatably supported on a support structure which has a heat source. An enclosed space exists between the cab and the support structure and heated air is conducted into the enclosed space. An air duct extends between the revolving cab and the enclosed space and is offset from the axis of rotation of the cab and thus is in constant airflow communication with the enclosed space and the interior of the cab for directing the heated air from the enclosed space and into the interior of the cab.

2 Claims, 3 Drawing Figures

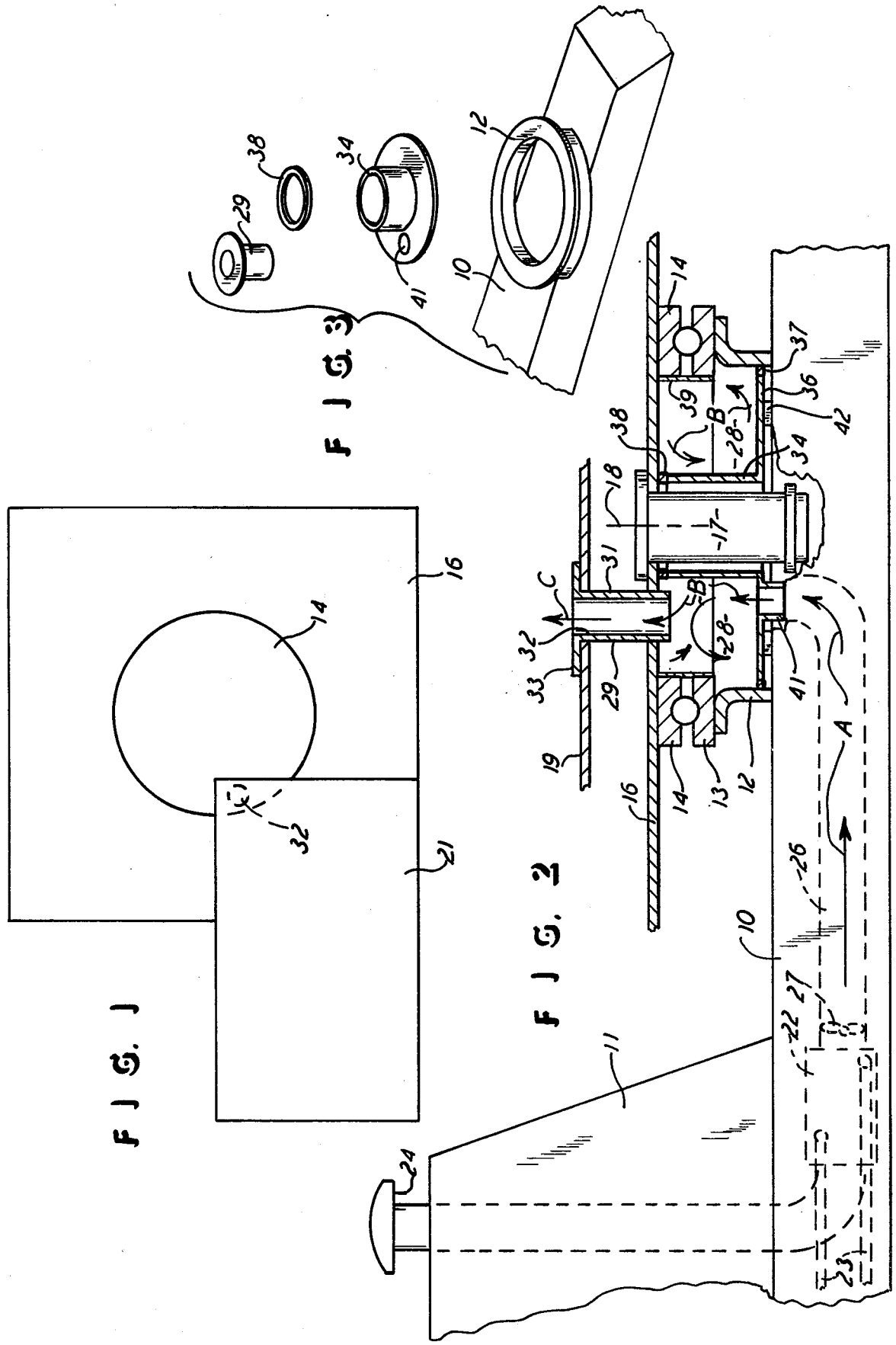

HEATING SYSTEM FOR A REVOLVING CAB

This invention relates to a heating system for a revolving cab, more particularly, it relates to a heating system useful for tractor type of vehicle which has a revolving cab on a support structure, and it is desired that the cab interior be heated.

BACKGROUND OF THE INVENTION

The prior art is already aware of machines such as tractors and cranes and the like which utilize an operator compartment or a cab which is rotatable about an upright axis on a support structure such as the tractor itself. One such example of a prior art crane is found in U.S. Pat. No. 3,909,961, and that has a cab which rotates about an upright axis and thus permits the operator and the working implement to face in any selected direction around an arc of rotation. The problem and concern with this type of arrangement is to heat the interior of the cab, and in some instances the heater for the prior art cabs has been a separate type of heater of a fuel-fired type which is made available to the interior of the cab. This type of heater is inherently dangerous and has both flame and fuel odors which are obnoxious as well as dangerous.

In the present invention, the heater utilizes the heat from the tractor engine itself and conducts that heat to the interior of the cab by a specially arranged enclosed space intervening between the support structure and the cab itself. Further, a present invention provides the arrangement as aforesaid and such that any rotated or turned position of the cab relative to the support structure will not cut off or even impede the flow of heated air into the cab though the air is flowing between the support structure and the rotatable cab itself. Still further the present invention accomplishes the aforementioned advantages and does so with inexpensive but reliable parts and arrangements and without in any way altering the basic construction of the support structure and the cab itself and thus without requiring any excessive space or complicated and expensive elements to achieve conducting the flow of heated air from the tractor engine and to the interior of the cab. Further, with this arrangement, the already available heat produced by the tractor engine is thus utilized, rather than being wasted, and is introduced into the interior of the cab for heating the cab.

Other advantages and objects will become apparent upon read- the following description in light of the accompanying drawings.

BRIEF DESCRIPTION OF THE DRAWINGS

FIG. 1 is a top plan view of a cab and a portion of its support structure as utilized in this invention.

FIG. 2 is an elevational view, partly in section, of the heating system of this invention and as schematically found in FIG. 1.

FIG. 3 is an exploded perspective view of certain of the parts shown in FIG. 2.

DETAILED DESCRIPTION OF THE PREFERRED EMBODIMENT

The heating system of this invention is particularly applicable to the arrangement in a tractor or crane or the like having a rotatable cab such as shown in U.S. Pat. No. 3,909,961, and that disclosure is incorporated by reference into this specification. In those general arrangements, and by way of explanation and disclosure herein, there is a support structure which is mobiley mounted and which includes an engine generally of the water cooled type. The engine is the power plant for the entire unit, and the rotatable cab is supported on the mobile support structure, all as shown in the drawing herein and in the reference patent and as will be understood by anyone skilled in the art.

The drawings herein show a portion of a support structure designated 10 and being that of a tractor or crane type of machine of a conventional arrangement such as that shown in the aforesaid reference to patent. The machine includes a water cooled type of engine 11, and there is the usual bearing mounting ring 12, which is suitably affixed as a part of the support structure and which supports a rotation bearing of an annular configuration and being of a ball bearing type as shown and having a lower race 13 and a upper race 14 with the 2 races being respectively suitably connected with the bearing mounting ring 12 and with a usual and conventional turntable mounting plate 16. Thus, with the arrangement shown and as will be understood by one skilled in the art, the turntable mounting plate 16 is rotatably mounted about the swivel on shaft 17 and thus rotates about the vertical axis 18. The operator's compartment or cab has a floor 19 which is suitably supported on the turntable 16 to rotate therewith and by virtue of the annular bearing or ring bearing shown.

Thus, FIG. 1 shows in a diagramatic form the turntable 16 and the bearing 14 and the cab designated 21 which of course extends over the cab for 19 in the usual arrangement. Thus, the turntable 16 along with the cab 21 will rotate about the axis 18 and under the influence of powered mechanism controlled by the operator for the usual rotation of the turntable 16 and cab 21, all as desired.

FIG. 2 also shows a conventional type of heat exchanger 22 suitably supported on the support structure 10 and having water hoses 23 connected therewith for directing water to and from the exchanger 22 relative to the engine 11 to thus bring heat to the exchanger 22. An air intake duct 24 is shown to extend to the exchanger 22 and extends therefrom in a portion designated 26 extending toward the axis or center of rotation of the turntable 16 and cab 21. An air blower 27 is disposed and operated in the air duct 26 to move the air therethru in the direction of the arrows designated A and to thus bring the air into the inlet duct 24 and through the exchanger 22 and into the connecting duct 26 to thus direct heated air to an enclosed space designated 28 and existing in annular configuration between the support structure 10 and the cab floor 19. Thus, the enclosed space 28 is annular and defined at least in part by the support structure 10 and the turntable 16 which is deemed to be a portion of the cab and turntable assembly, and the heated air may follow the path of the arrows designated B and thus the air will be directed into the space 28 and into a connecting duct or passageway 29 extending between the space 28 and the interior of the cab 19. Finally, the arrow designated C shows the heated air entering the interior of the cab, and that is the air is directed to a location above the cab floor 19 and thus into the interior of the cab for heating the cab, as desired.

The passageway or duct 29 is shown to be tubular in its lower portion 31 which extends through an opening 32 in the cab floor 19, and it has a flange 33 on the upper end for overlying the floor 19 and thus directing the air above the floor 19, as mentioned.

It is further seen that the annular space 28 is defined by a cylindrically-shaped member 34 which surrounds the swivel 17 and which has a lower flange 26 extending to an annular sealing washer 37 interposed between the flange 36 and the bearing mounting member 12 for air sealing therebetween. Also, the upper end of the member 34 had an annular wiper ring 38 interposed between the member 34 and the lower surface of the turntable 16, for air sealing therebetween and permitting the turntable 16 to rotate relative to the member 34. Still further, the bearing members 13 and 14 will preclude the escape of heated air from the space 28, and there may be a cylindrical air sealing member 39 extending on the inner-circular wall of the bearing races to preclude the escape of air from the space 28. Finally, it will be seen that the member 34 has an air inlet passageway 41 which connects with and is therefore in air-flow communication with the duct 26 so that the heated air will be directed into the space 28 as shown by the arrows B. Of course, the member 34 will be held securely relative to the bearing support member 12 and to the support structure 10 as well as relative to the turntable 16, and support bosses 42 on the support structure 10 serve to hold the member 34 upwardly in the position shown and for the airtight function described.

Accordingly, there is provided a support structure 10 with a cab 21 rotatable thereon and with the two defining an enclosed space 28 therebetween, and with the turntable portion 16 of the cab assembly forming the direct part of the enclosure and with the bearing support 12 and the interposed member 34 forming a part thereof, along with the bearing member 12, all as shown. With this arrangement, the heated space 28 is concentric with the rotation axis 18 and extends annularly therearound while the passageway or duct 29 is offset or eccentric relative to the axis 18 and thus the duct 29 is always in air-flow communication with the space 28 for directing the heated air into the cab 21. Accordingly, there is a first means, such as the tubular member 34, substantially defining the inner diameter of the annular space 28, and there is a second means, including the bearing support member 12 and the bearing races 13 and 14 along with the shield 39, substantially presenting the outer diameter of the annular space 28. Therefore the space 28 is defined by the support structure elements and the cab assembly elements, including the turntable 16 as a part of the cab assembly. Of course, the member 34 is stationary along with a bearing support member 12 and the lower race 13. The shield 39 may rotate with either race 13 or 14 or it may be affixed with the turntable 16.

What is claimed is:

1. A heating system for a revolving cab, comprising a support structure, a heat source on said support structure, a cab rotatably supported on said support structure, a rotation bearing interposed between said support structure and said cab for rotatably supporting said cab and being annular in shape and defining an air-tight enclosed space, said enclosed space extending around the axis of rotation of said cab and being in air-flow communication with said heat source and with said enclosed spaced being further defined by said support structure and said cab and located therebetween, a blower in flow-communication with an air passageway for blowing heated air from said heat source and into said enclosed space, an air-flow duct extending between said cab and said enclosed space for conducting heated air into said cab, said air-flow duct being offset from the axis of rotation of said cab and extending into said enclosed space to thereby have said air-flow duct in air-flow communication with said enclosed space in all rotated positions of said cab, said air-flow duct and said air passageway having their air blower axes parallel to the axis of rotation for air flow in the axial direction, and air-flow seals interposed between said support structure and said cab and sealing said enclosed space while allowing for rotation of said cab.

2. The heating system for a revolving cab, as claimed in claim 1, including a stationary tubular structual member disposed in said enclosed space and co-axial with the axis of rotation of said cab and interposed between said support structure and said cab.

* * * * *